Patented June 6, 1944

2,350,725

UNITED STATES PATENT OFFICE 2,350,725

PROCESS FOR RECOVERING METALS FROM STEEL SLAGS

Patrick Edgar Cavanagh, Hamilton, Ontario, Canada

No Drawing. Application October 10, 1942, Serial No. 461,594. In Canada September 26, 1942

12 Claims. (Cl. 75—11)

My invention relates to a process for recovering metals from steel slags and the object of my invention is to provide such a process through the use of which oxidized metals contained in the slags of open hearth furnaces, electric furnaces, etc., can be profitably removed.

A further object of my invention is to provide an exothermic reducing agent to be mixed with the slag in carrying out my process, and in the later steps of my process to utilize part of the process slag for the production of further quantities of my exothermic agent for treating further batches of slag whereby the process is continuous and of very economical operation.

Average open hearth slag consists of a mixture of oxides, most of which are basic, as lime, iron oxide, manganese oxide, and oxides of other metals such as chromium. The acid oxides are mainly silica and alumina. The reduction of the basic metallic oxides to metals in the slag has heretofore been considered as a very uneconomical and, to say the least, difficult operation, the reason being that if metallic oxides in the slag are reduced to metal without any provision being made for raising the temperature of the slag or maintaining its basicity, the slag through the lowering of its basic content thickens, and the beads of metal released by the reduction are trapped by the thick slag surrounding such beads and never settle to the bottom.

To overcome the foregoing difficulty and obtain the reduced metal in a pool at the bottom of the slag, the fluidity of the slag must be maintained, which can be done by raising its temperature which, though feasible, is not a very practical or economical operation.

In carrying out my invention I utilize a reducing agent which gives a tremendous exothermic heat whereby the fluidity of the slag is maintained, and also such reducing agent is convertible to a basic oxide in the slag when it absorbs oxygen and thus replaces the metallic base at each point where it is removed. An example of such a reducing agent having such several desirable features is calcium silicon carbide. In this compound the calcium is converted to calcium oxide, a very strong base; the silicon releases a tremendous exothermic heat; and the carbide is a powerful reducing agent.

When a small quantity of calcium silicon carbide is introduced into molten slag, a re-action begins which gives off heat and raises the temperature of the small amount of slag in contact with the piece, thus raising its fluidity. The metallic oxides of iron and manganese plus any other metallic oxides that are present, as well as phosphorus, are reduced. These bases are replaced by the calcium oxide formed from the reducing agent and the slag maintains its fluidity. In some cases where the slag temperature is very low on leaving the furnace it is necessary to add some oxidizing agent such as a nitrate along with the calcium silicon carbide to provide an initial easily started re-action which will give a local rising temperature and allow the main re-action to start.

In a standard open hearth process, as the open hearth is tapping steel pours into a ladle, and the slag overflows into a slag pot. The average open hearth slag analysis is approximately 13% Fe, 7% Mn, 45% CaO, and 15% SiO$_2$.

In carrying out my process a relatively small quantity of wood is placed in the bottom of the pot in which the slag is to be received, which will perform some small reduction and provide an initial violent agitation. The reduction process proper is achieved by the addition of calcium silicon carbide to the slag as it is pouring into the slag pot. As before pointed out, the calcium silicon carbide gives the exothermic heat to aid the re-actions and to maintain the proper slag basicity as the basic metallic oxides are removed. The weight of calcium silicon carbide used approximates 10% of the weight of the slag being treated.

A small quantity (about 1% of slag weight) of 90% ferro-silicon is also introduced into the slag to clean up remaining metallic oxides.

The filled treated slag pot is lifted and carried to an electric arc furnace at which time metal has settled to the bottom of the slag pot in the general approximate weight proportion of one part of metal to four parts of slag. In practice the capacity of the arc furnace is such that it can receive three or four pots of treated slag during a two to three hour period. The slag pots are poured into the arc furnace and as the metal settles to the bottom of the furnace most of the slag overflows into another slag pot. Any bits of slag remaining on the surface of the metal in the furnace when it is full of metal are skimmed off.

About 10% of the overflow slag from the arc furnace is retained to make further batches of calcium silicon carbide, while the remainder of the slag is discarded. The retained overflow slag from the electric furnace is poured into a second arc furnace and about 27%, by weight, of coke added. Treatment is then about 2½ hours. The exact amount of coke used and length of treatment time are determined by the desired analysis of the product. This in turn is fixed by the amount of metallic bases which must be reduced from the slag being treated and the amount of exothermic heat desired. An average composition would be 75% calcium carbide and the rest calcium silicon.

When a sufficient number of treated slag pots have been poured into the arc furnace to load it with recovered metal, a new slag is made, using lime, scale, silica and fluorspar, and added to the metal, the electric power in the arc furnace being at this time turned on. Iron or manganese ore is added to the metal in the furnace to oxidize any phosphorus in the metal, which is taken up by the lime slag. The metal in the arc furnace after being finally treated is tapped off.

The recovered metal, in average practice will run between 10% and 15% manganese, the resulting dilution being due to steel and iron accidentally lost from the open hearth and ladle. The recovered metal may be used in many ways in an open hearth plant, e. g. it can be further worked to make Hatfield steel; it can be enriched slightly to make 18% speigeleisen; or it can be taken to the open hearth furnace or pig iron mixer and poured in hot. In the average open hearth plant the weight of recovered metal will run between 5% and 6%, of total production of steel.

Although I have described a particular embodiment of my invention and its specific application to open hearth slags, it will be readily appreciated by those skilled in the art, that my oxidizing exothermic treatment can be used on other oxidizing steel slags, without departing from the spirit of my invention; for example, other oxidizing steel slags can be treated by the use of my process for the recovery of other metals besides iron and manganese. For instance: electric furnace slags contain fairly large percentages of chromium, vanadium, nickel and molybdenum, which can be recovered economically by my process.

What I claim as my invention is:

1. A process for the recovery of metal from molen oxidizing slag which has been removed from the steel bath comprising the addition of an exothermic agent to the slag, such exothermic agent being convertible to a basic oxide as it absorbs oxygen in the slag, such basic oxide replacing the particles of metal separating themselves from the slag, whereby the exothermic action in conjunction with the replacement of the metal particles retains fluidity of the slag as the metal is being precipitated, introducing the slag and separated metal into an arc furnace, removing the slag from the metal, and placing a portion of such removed slag into a second furnace, adding coke to the slag in the second furnace to produce an exothermic agent which is convertible into a basic oxide.

2. A process for the recovery of iron and manganese from molten open hearth slags, comprising the placing of a small quantity of wood in the slag receiving pot to give initial agitation as the slag is poured into the pot and adding calcium silicon carbide to the slag in the pot to carry out the reduction process proper.

3. A process for the recovery of iron and manganese from molten open hearth slags, comprising the placing of a small quantity of wood in the slag receiving pot to give initial agitation as the slag is poured into the pot and adding calcium silicon carbide to the slag in the pot in the proportion of between 8% and 25% of the slag weight.

4. A process for the recovery of iron and manganese from molten open hearth slags, comprising the placing of a small quantity of wood in the slag receiving pot to give initial agitation as the slag is poured into the pot and adding calcium silicon carbide to the slag in the pot, placing the processed slag in an arc furnace, drawing off the slag from the recovered metal and adding a new slag made of lime, scale, silica and fluorspar to the recovered metal in the furnace, placing a portion of the drawn-off slag into a second furnace and adding coke to the slag in the second furnace to produce calcium silicon carbide for use in repeating the process.

5. A process for the recovery of iron and manganese from molten open hearth slags, comprising the placing of a small quantity of wood in the slag receiving pot to give initial agitation as the slag is poured into the pot and adding calcium silicon carbide to the slag in the pot in the proportion of between 8% and 25% of the slag weight, placing the processed slag in an arc furnace, drawing off the slag from the recovered metal and adding a new slag made of lime, scale, silica and fluorspar to the recovered metal in the furnace, placing a portion of the drawn-off slag into a second furnace and adding coke to the slag in the second furnace to produce calcium silicon carbide for use in repeating the process.

6. A process for the recovery of iron and manganese from molten open hearth slag, which has been removed from its steel bath, comprising the addition of calcium silicon carbide to the slag in the proportion of between 8% and 25% of the slag weight and also adding 90% ferrosilicon to the slag in the proportion of between ½% and 10% of the slag weight, placing the processed slag in an arc furnace, drawing off the slag from the recovered metal and adding a new slag made of lime, scale, silica and fluorspar to the recovered metal in the furnace, placing a portion of the drawn-off slag into a second furnace and adding coke to the slag in the second furnace to produce calcium silicon carbide for use in repeating the process.

7. A process for the recovery of iron and manganese from molten open hearth slag, which has been removed from its steel bath, comprising the addition of calcium silicon carbide to the slag, placing the processed slag in an arc furnace, drawing off the slag from the recovered metal and adding a new slag made of lime, scale, silica and fluorspar to the recovered metal in the furnace, placing a portion of the drawn-off slag into a second furnace and adding coke in the percentage between 25% and 30% of the slag weight to produce calcium silicon carbide for use in repeating the process.

8. A process for the recovery of iron and manganese from molten open hearth slag, which has been removed from its steel bath, comprising the addition of calcium silicon carbide to the slag, placing the processed slag in an arc furnace, drawing off the slag from the recovered metal and adding a new slag made of lime, scale, silica and fluorspar to the recovered metal in the furnace, placing a portion of the drawn-off slag into a second furnace and adding coke to the slag in the second furnace to produce calcium silicon carbide for use in repeating the process.

9. A process for the recovery of iron and manganese from molten open hearth slags, comprising the placing of a small quantity of wood in the slag receiving pot to give initial agitation as the slag is poured into the pot and adding calcium silicon carbide to the slag in the pot, placing the processed slag in an arc furnace, drawing off the slag from the recovered metal and adding a new slag made of lime, scale, silica and fluorspar to the recovered metal in the furnace, placing a portion of the drawn-off slag into a second furnace and adding coke in the precentage between 25% and 30% of the slag weight to produce calcium silicon carbide for use in repeating the process.

10. A process for the recovery of iron and manganese from molten open hearth slags, comprising the placing of a small quantity of wood in the slag receiving pot to give initial agitation as the slag is poured into the pot and adding calcium silicon carbide to the slag in the pot in the proportion of between 8% and 25% of the slag weight, placing the processed slag in an arc furnace, drawing off the slag from the recovered metal and adding a new slag made of lime, scale, silica and fluorspar to the recovered metal in the furnace, placing a portion of the drawn-off slag into a second furnace and adding coke in the percentage between 25% and 30% of the slag weight to produce calcium silicon carbide for use in repeating the process.

11. A process for the recovery of iron and manganese from molten open hearth slags, comprising the placing of a small quantity of wood in the slag receiving pot to give initial agitation as the slag is poured into the pot and adding calcium silicon carbide to the slag in the pot, placing the processed slag in an arc furnace, drawing off the slag from the recovered metal and adding a new slag made of lime, scale, silica and fluorspar to the recovered metal in the furnace.

12. A process for the recovery of iron and manganese from molten open hearth slags, comprisings the placing of a small quantity of wood in the slag receiving pot to give initial agitation as the slag is poured into the pot and adding calcium silicon carbide to the slag in the pot in the proportion of between 8% and 25% of the slag weight, placing the processed slag in an arc furnace, drawing off the slag from the recovered metal and adding a new slag made of lime, scale, silica and fluorspar to the recovered metal in the furnace.

PATRICK EDGAR CAVANAGH.